(12) United States Patent
Murayama

(10) Patent No.: US 6,252,993 B1
(45) Date of Patent: *Jun. 26, 2001

(54) VIDEO SIGNAL CODING AND DECODING METHOD

(75) Inventor: Jun Murayama, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/932,408

(22) Filed: Sep. 17, 1997

Related U.S. Application Data

(63) Continuation of application No. 08/457,830, filed on Jun. 1, 1995, now Pat. No. 5,757,972.

(30) Foreign Application Priority Data

Jun. 3, 1994 (JP) .................................................. 6-145582

(51) Int. Cl.⁷ .................................................. G06K 9/48
(52) U.S. Cl. ........................... 382/242; 382/197; 382/199
(58) Field of Search .................................. 382/197, 199, 382/198, 200, 242, 266, 245, 232, 251; 358/261.1, 261.2, 261.3; 348/384, 390

(56) References Cited

U.S. PATENT DOCUMENTS

| | | | | |
|---|---|---|---|---|
| 3,927,251 | * | 12/1975 | White et al. | 358/261.3 |
| 4,087,788 | * | 5/1978 | Johannesson | 382/197 |
| 4,107,648 | | 8/1978 | Frank | 358/261.3 |
| 4,307,377 | * | 12/1981 | Pferd et al. | 382/242 |
| 4,972,495 | * | 11/1990 | Blike et al. | 382/199 |
| 5,099,521 | * | 3/1992 | Kosaka | 382/242 |
| 5,303,313 | * | 4/1994 | Mark et al. | 382/235 |
| 5,335,298 | * | 8/1994 | Hevenor et al. | 382/199 |
| 5,424,556 | | 6/1995 | Symosek et al. | 250/559.32 |
| 5,757,972 | * | 5/1998 | Murayama | 382/242 |

OTHER PUBLICATIONS

Gonzalez et al. *Digital Image Processing*. Addison–Wesley, pp. 195–201, 414–429, 484–486, Mar. 1992.*

* cited by examiner

*Primary Examiner*—Jon Chang
(74) *Attorney, Agent, or Firm*—Sonnenschein, Nath & Rosenthal

(57) ABSTRACT

The feature points of the input video signal are detected by canny edge detecting method, the coordinates of the feature points detected are chain coded, the length of the region, including the feature points, of which edge intensity is the specified value or more in the edge intensity maximum change direction at the feature point coordinates obtained when the feature point is detected, are code, and the chain-coded data and the region length coded data are then multiplexed. Thereby, the amount of bits required for coding of the coordinates information can be reduced, as a result the total amount of codes can be reduced.

14 Claims, 16 Drawing Sheets

| $C = \arctan(B/A)$ | OUTPUT |
|---|---|
| $0 \leq C \leq \frac{1}{8}\pi$ | 0 |
| $\frac{1}{8}\pi \leq C \leq \frac{3}{8}\pi$ | 1 |
| $\frac{3}{8}\pi \leq C \leq \frac{5}{8}\pi$ | 2 |
| $\frac{5}{8}\pi \leq C \leq \frac{7}{8}\pi$ | 3 |
| $\frac{7}{8}\pi \leq C \leq \frac{9}{8}\pi$ | 0 |
| $\frac{9}{8}\pi \leq C \leq \frac{11}{8}\pi$ | 1 |
| $\frac{11}{8}\pi \leq C \leq \frac{13}{8}\pi$ | 2 |
| $\frac{13}{8}\pi \leq C \leq \frac{15}{8}\pi$ | 3 |
| $\frac{15}{8}\pi \leq C \leq 2\pi$ | 0 |

FIG. 6

| C0 | C1 | C2 |
|---|---|---|
| C3 | A | C4 |
| C5 | C6 | C7 |

FIG. 8A

| MAXIMUM CHANGE DIRECTION SIGNAL | CHANGE POINT SPREAD SIGNAL OF FIRST MAXIMUM CHANGE DIRECTION CANDIDATE POINT | CHANGE POINT SPREAD SIGNAL OF SECOND MAXIMUM CHANGE DIRECTION CANDIDATE POINT |
|---|---|---|
| 0 | C3 | C4 |
| 1 | C7 | C0 |
| 2 | C6 | C1 |
| 3 | C5 | C2 |

FIG. 8B

|   |    |    |
|---|----|----|
| -1| -2 | -1 |
| 0 | 0  | 0  |
| 1 | 2  | 1  |

FIG. 11A

|    |   |   |
|----|---|---|
| -1 | 0 | 1 |
| -2 | 0 | 2 |
| -1 | 0 | 1 |

FIG. 11B

| ADDRESS | SEARCH DIRECTION DIFFERENCE VALUE ROM84 | SEARCH DIRECTION DIFFERENCE VALUE ROM85 | SEARCH DIRECTION DIFFERENCE VALUE ROM86 | SEARCH DIRECTION DIFFERENCE VALUE ROM87 |
|---|---|---|---|---|
| 0 | 0 | -1 | 0 | 1 |
| 1 | 1 | 1 | -1 | -1 |
| 2 | 1 | 0 | -1 | 0 |
| 3 | 1 | -1 | -1 | 1 |

FIG. 13

VIDEO SIGNAL CODING AND DECODING METHOD

This is a continuation of application Ser. No. 08/457,830, filed Jun. 1, 1995 now U.S. Pat. No. 5,757,972.

BACKGROUND OF THE INVENTION

1. Field of the Invention

This invention relates to a video signal coding method and a decoding method, and more particularly, applicable is to the case where feature points of an image are detected and then high-efficiency coding of the video signal is performed.

2. Description of the Related Art

Heretofore, as a method for high-efficiency coding of a video signal, there has been a method wherein an input video signal is serial-parallel converted by means of a DCT (discrete cosine transform), and then adaptive quantization according to a human visual property is performed for each frequency band, or a method wherein an image is subband-divided using wavelet base and then weighted so as to code for each band. According to these with methods, distortion is not particularly visible and a high compression rate can be obtained.

However, in these coding methods, such a disadvantage exists that a visual undesirable effect such as a block distortion becomes noticeable as a compression rate is raised. Then, as a coding method which can suppress a visual undesirable distortion under a high compression rate, there is a structure extracting and coding method according to change point detection of an image, in which the distinctive points of the structure of the image are extracted and effectively coded.

For example, as shown in FIG. 1, in a structure extracting and coding apparatus 1 which codes a video signal using a structure extracting and coding method, an input video signal S1 is quantized by a quantizer 2, thereby a quantization coefficient S2 is generated, which is sent to a multiplexer 3.

On the other hand, the structure extracting and coding apparatus 1 inputs the input video signal S1 to a two-dimensional change point detecting circuit 4, which detects the feature points, and sends a flag "1" to a chain coder 5 as a feature point signal S3 if the present signal is detected as the feature point, otherwise sends a flag 0. A chain coder 5 chain codes the pixels of which feature point signals S3 are "1" in one frame, and sends it to the multiplexer 3 as a chain code output S4.

The multiplexer 3 multiplexes the chain code output S4 and the quantization coefficient S2 at the feature point, and then sends this to a buffer memory 6 as a multiplexed feature point signal S5. The buffer memory 6 smooths an information quantity of the multiplexed feature point signal S5, and outputs it as an output signal S6 of the structure extracting and coding apparatus 1 according to feature point detection of the image.

Here, the two-dimensional change point detecting circuit 4 is constructed, for instance, as shown in FIG. 2. More specifically, the two-dimensional change point detecting circuit 4 once stores the input video signal S1 in a frame buffer 10, and then smooths it by means of a filter 11. A smoothed signal S10 output from the filter 11 is sent to a lateral direction processing block 12 and a longitudinal direction processing block 13, respectively.

The lateral direction processing block 12 supplies the smoothed signal S10 to an adder 16 via a delay element 14 and a multiplier 15 of which multiplication coefficient is −1 respectively, thereby a difference between the present signal and the signal preceding one sample is found by the adder 16, so that a lateral direction amplitude inclination signal S11 is generated. The lateral direction amplitude inclination signal S11 is squared by a multiplier 17, thereby a lateral direction amplitude inclination signal power S12 is obtained. The lateral direction amplitude inclination signal power S12 is supplied to a multiplier 21 via a delay element 18 and an adder 19 to which an inverted threshold value T is given, and also supplied to the multiplier 21 via an adder 20 to which the inverted threshold value T is given. Thereby, in the multiplier 21, a difference signal S13 between the lateral direction amplitude inclination signal electric power S12 and the threshold value T is multiplied by a difference signal S14 between the one sample preceding lateral direction amplitude inclination signal power S12 and the threshold value T, and the multiplication result signal S15 is sent to a comparator 22. The comparator 22 sends a flag "1" in the case where the multiplication result signal S15 is less than 0, or a flag "0" in the case where it is "0" or more to an OR circuit 23 as a lateral direction change point detection signal S16.

The longitudinal direction processing block 13 supplies the smoothed signal S10 to an adder 26 via a line delay 24 and a multiplier 25 respectively, thereby a difference between the present signal and the signal preceding one line is obtained by the adder 26, so that a longitudinal direction amplitude inclination signal S17 is generated. The longitudinal direction amplitude inclination signal S17 is squared by a multiplier 27, thereby a longitudinal direction amplitude inclination signal power S18 is obtained. The longitudinal direction amplitude inclination signal power S18 is supplied to a multiplier 31 via a line delay 28 and an adder 29 to which an inverted threshold value T is given, and also supplied to the multiplier 31 via an adder 30 to which the inverted threshold value T is given. Thereby, in the multiplier 31, a difference signal S19 between the longitudinal direction amplitude inclination signal power S18 and the threshold value T is multiplied by a difference signal S20 between the longitudinal direction amplitude inclination signal power S18 preceding one line and the threshold value T, and the multiplication result signal S21 is sent to a comparator 32. The comparator 32 sends a flag "1" in the case where the multiplication result signal S21 is less than "0" or a flag "0" in the case where it is "0" or more to the OR circuit 23 as a longitudinal direction change point detection signal S22.

By ORing the lateral direction change point detection signal S16 with the longitudinal direction change point detection signal S22, the OR circuit 23 outputs a two-dimensional change point detecting circuit output signal S23.

In coding of feature point coordinates based on the conventional two-dimensional change point detecting method and chain coding described above, with respect to the change points of the linear differential value power of the input video signal against a certain threshold value, for instance the points at which a sharp change arises locally, the two-dimensional change point detecting circuit 4 at first detects two points of the starting point and the ending point of that change as feature points, and the following chain coder 5 separately chain codes.

Therefore, in the conventional feature point coordinates coding method, on the edge portion at which a sharp change arises, the position coordinates of the two curves are always coded, hence such a disadvantage has existed that the code quantity increases correspondingly.

SUMMARY OF THE INVENTION

In view of the foregoing, an object of the present invention is to provide a video signal coding method and a decoding method which are possible to decrease the total code quantity by decreasing the bit quantity required for coding of the coordinate information when the feature point of the input video signal is detected and then the coordinate of the feature point is chain coded.

The foregoing object and other objects of the invention have been achieved by the provision of a video signal coding method for detecting feature points of an input video signal (S1) and for coding coordinates of the feature points, comprising the steps of: detecting feature points (S30) of the input video signal (S1) by canny edge detecting method; performing chain coding (S33) of the coordinates (S30) of the feature points detected at the feature point detecting step; coding the length of the region (S32), including the feature points, of which edge intensity is the specified value or more in the edge intensity maximum change direction (S31) at said feature point coordinates obtained at the feature point detecting step; and multiplexing the chain coded data (S33) obtained at the chain coding step and the region length coded data (S32) obtained at the edge region length coding step.

Furthermore, secondly in the present invention, at the edge region length coding step, a mean value of the length of the region, including the feature points, of which edge intensity is the specified value or more in the edge intensity maximum change direction (S31) at the feature point coordinates is further obtained, and then the mean value is coded (S32A); and at the multiplexing step, the chain coded data (S32A) obtained in the chain coding step and the mean region length coded data (32A) obtained at the edge region length coding step are multiplexed.

Furthermore, thirdly the present invention provides the video signal coding method, comprising the steps of: detecting feature points of the input video signal (S1) by the canny edge detecting method; performing chain coding (S33) of the coordinates of the feature points (S30) detected at the feature point detecting step; obtaining the length of the region (S32), including the feature points, of which edge intensity is the specified value or more in the edge intensity maximum change direction (S31) at the feature point coordinates obtained at the feature point detecting step; setting a cut flag (S80 or S80A) at the portion where the region length (S32) greatly changes, with respect to the region length (S32) obtained in response to each feature point by the edge region length detecting step, and coding the mean value of the region length (S32) from the chain starting point or the place where the cut flag (S80 or S80A) is set to the chain ending point or the place where the cut flag (S80 or S80A) is subsequently set; and multiplexing the chain coded data (S33) obtained at the chain coding step, and the mean region length coded data (S81 or S81A) and the cut flag (S80 or S80A) obtained at the mean region length coding step.

Furthermore, fourthly in the present invention, at the mean region length coding step, the cut flag (S80) is set at the place where the absolute value of the difference between the present region length and the preceding region length becomes to the specified threshold value or more.

Furthermore, fifthly in the present invention, at the mean region length coding step, the absolute value of the difference (S90) between the region length of the chain starting point (S32) obtained at the edge region length detecting step and the region length of the following each feature point (S32) is sequentially compared with the specified threshold value, and the cut flag (S80A) is set at the place where the absolute value of the difference becomes to the specified threshold value or more, and then the absolute value of the difference (S90) between the region length (S32) corresponding to the place where the cut flag (S80A) is set and the region length of the subsequent each feature point (S32) is sequentially compared with the specified threshold value, and said cut flag (S80A) is set at the place where the absolute value of the difference (S90) becomes to the threshold value or more.

Furthermore, sixthly the present invention provides a video signal decoding method for decoding a coded data (P1) generated by multiplexing a chain coded one (S33) of feature point coordinates (S30) detected from the input video signal (S1) by canny edge detecting method and a region length data (S32) obtained by coding a length of the region (S32), including the feature points, of which edge intensity is the specified value E or more in the edge intensity maximum change direction (S31) at the feature point coordinates, wherein: coordinates data of the feature point (P3, P4, P5) and the region length data (P2) are separated from the coded data (P1); and end point coordinates (P13, P14) of an edge region corresponding to each feature point are decoded on the basis of the coordinates data of the feature point (P3, P4, P5) and the region length data (P2).

Furthermore, seventhly in the present invention, the region length data is a mean region length data (S32A, S81, S81A) which is obtained by averaging the lengths of a plurality of the regions; the coordinates data of the feature point (J2, J3, J4, R2, R3, R4) and the mean region length data (J6, R5) are separated from the coded data (J1, R1); and end point coordinates (J17, J18, R14, R15) of an edge region corresponding to the each feature point are decoded based on the coordinates data of the feature point (J2, J3, J4, R2, R3, R4) and the mean region length data (J17., J18. R14. R15).

Furthermore, eighthly the present invention provides a video signal decoding method for decoding a coded data generated by multiplexing a chain-coded one (S33) of feature point coordinates (S30) detected from the input video signal (S1) by canny edge detecting method, the cut flag (S80, S80A) set at a place where a length of region (S32) greatly changes, by obtaining length of region (S32), including the feature points, of which edge intensity is the specified value E or more in the edge intensity maximum change direction (S31) at the feature point coordinates, and a mean region length data (J1) obtained by averaging the region length (S32) between the cut flags (S80, S80A), wherein: the coordinates data of the feature point (J2, J3, J4), the cut flag (J5), and the mean region length data (J6) are separated from the coded data (J1); and if the cut flag (J5) is set, the starting point of the list is defined as the final point of the preceding list, and then end point coordinates of the edge region (J17, J18) corresponding to each feature point are decoded based on the coordinates data of the feature point (J2, J3, J4) and the mean region length data (J17, J18).

In the first invention, the feature point, which is generally detected as two parallel curves at the edge portion, can be represented by the chain-coded data (S33) which goes along the center of the two curves and the region length coded data (S32) which is the distance between the two curves. As a result, the bit quantity required for coding of the coordinates information can be reduced.

Furthermore, in the second invention, the mean region length coded data (S32A) composed of the average of the region lengths (S32) is multiplexed to the chain-coded data (S33), thereby coding of all of the region length (S32) obtained in response to each feature point is not required, but coding of the mean region length coded data (S32A) is merely required. As a result, the bit quantity required for coding of the coordinates information can be further reduced.

Further, in the third and the fourth inventions, when the mean region length coded data (S81 or S81A) is to be obtained, the cut flag (S80 or S80A) is deemed as a boundary, and the mean region length coded data (S81 or S81A) can be obtained from the average of the region lengths (S32) of which values are roughly equal to each other, hence the errors of the mean region length coded data (S81 or S81A) can be reduced. Correspondingly, the degradation of the image quality can be reduced.

Further, in the fifth invention, even if the value of the region length (S32) changes gradually, each region length (S32) can be compared with the forefront value which is deemed as the reference, therefore the errors of the mean region length coded data (S81 or S81A) can be reduced, and also the degradation of the image quality can be reduced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 6 is a table explaining the output of a maximum change direction calculating circuit;

FIGS. 8A and 8B are tables explaining the selection of a change intensity signal against the maximum change direction;

FIGS. 11A and 11B are tables showing the filter coefficients of a vertical direction filter circuit and a horizontal direction filter circuit of FIG. 10;

FIG. 13 is a table showing the content of a search direction difference value ROM against the maximum change direction signal;

DETAILED DESCRIPTION OF THE EMBODIMENT

Figure 1:
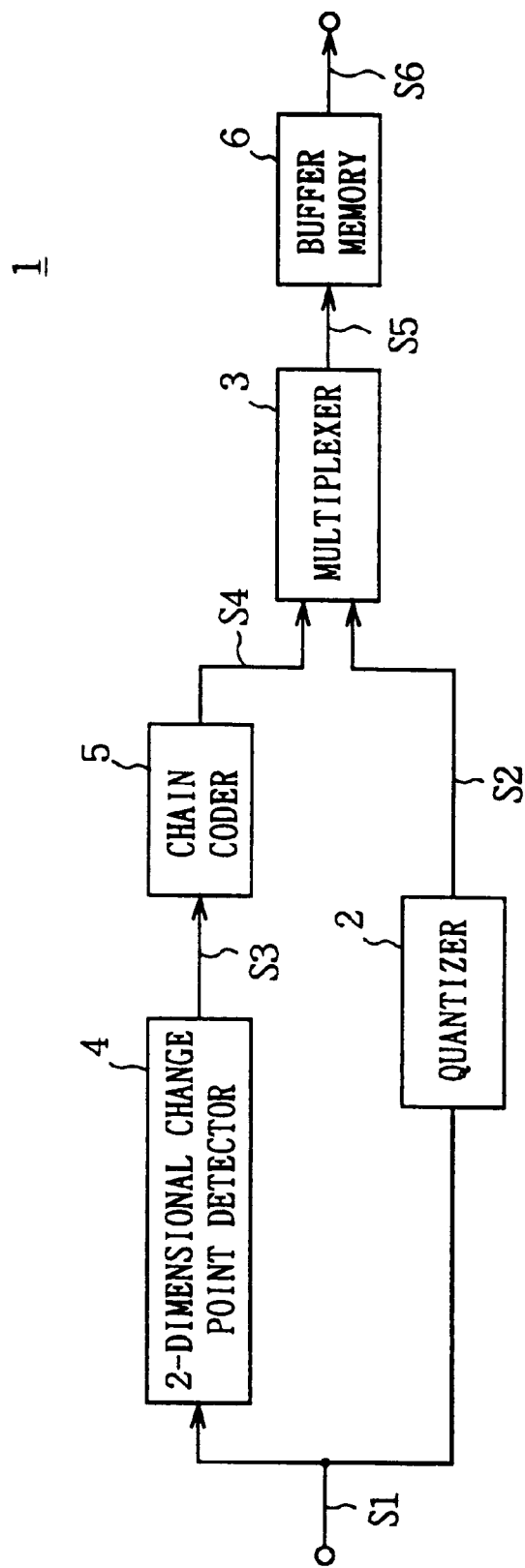
FIG. 1 is a block diagram showing the construction of conventional structure extracting and coding apparatus.
Figure 2:
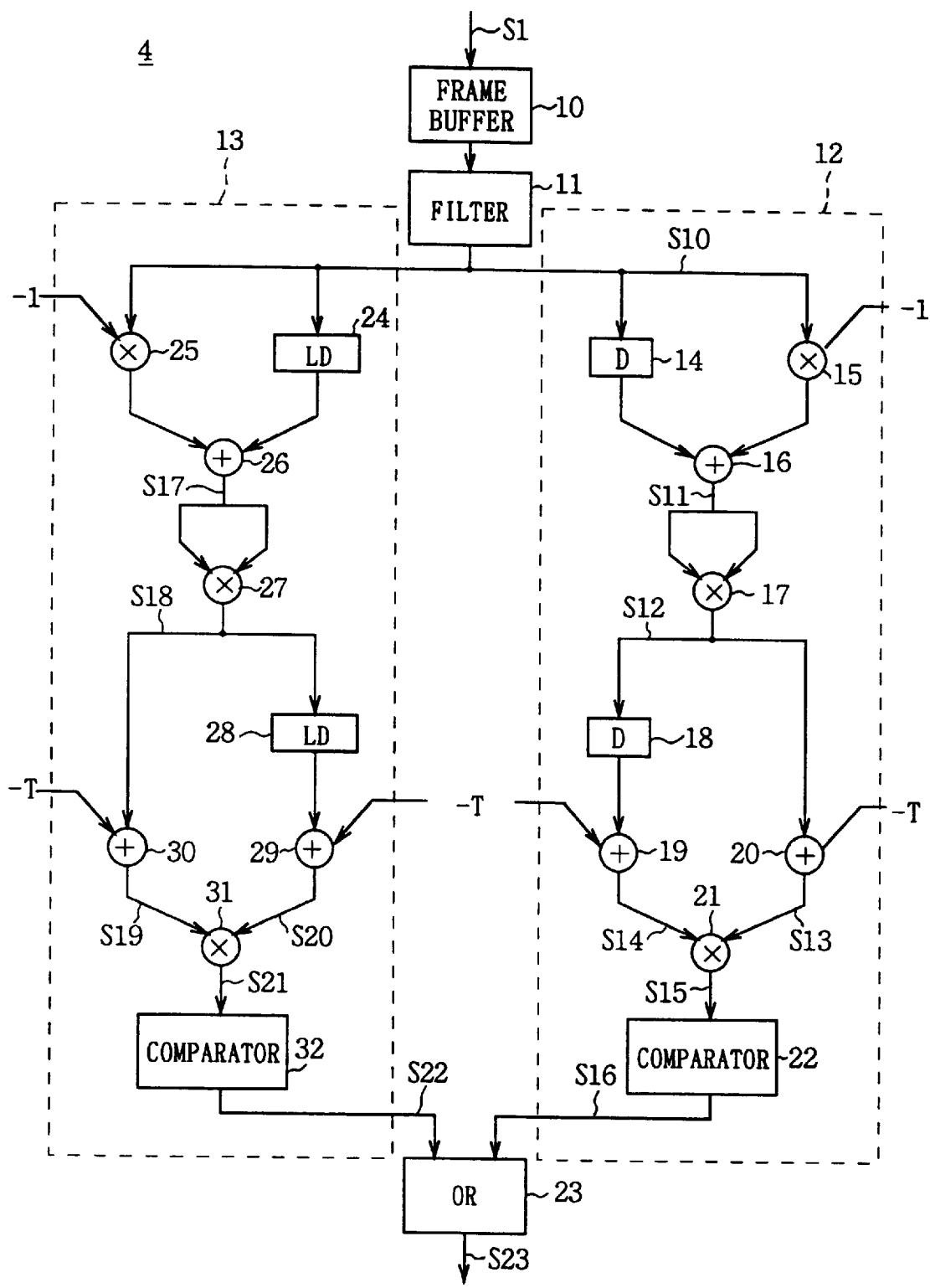
FIG. 2 is a block diagram showing the construction of conventional two-dimensional change point detecting circuit.
Figure 3:
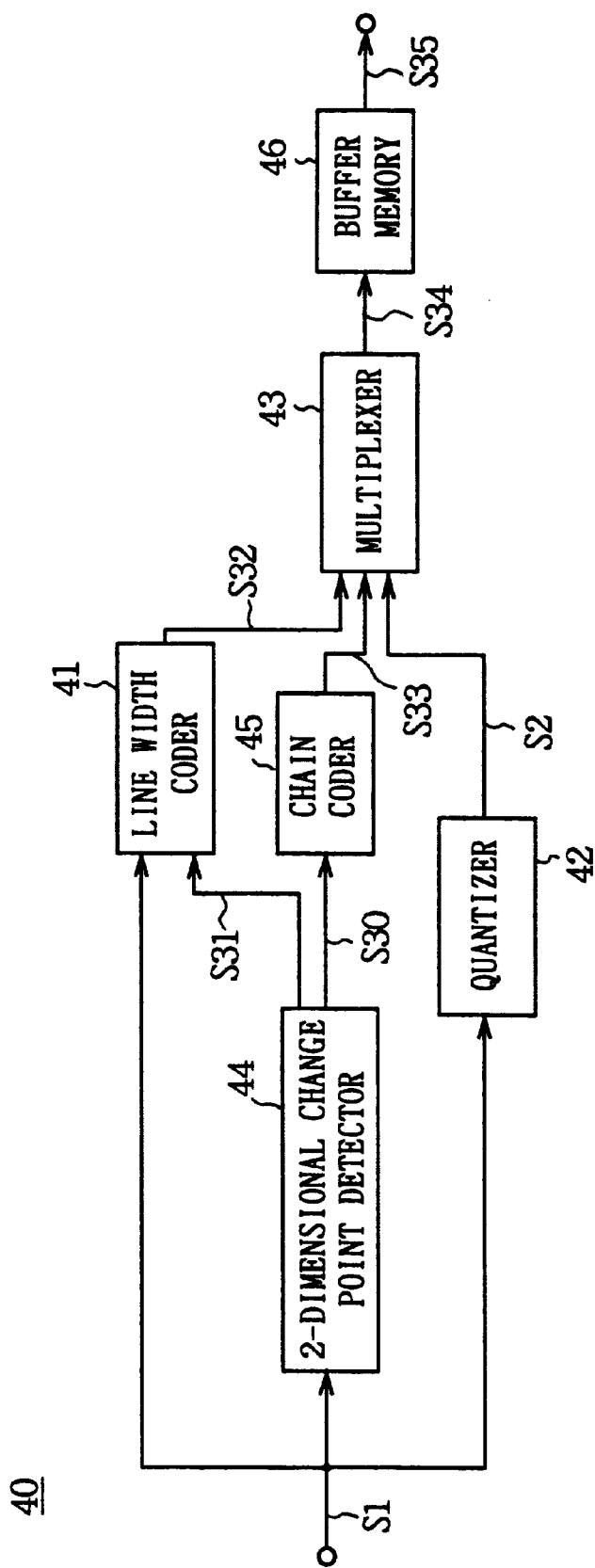
FIG. 3 is a block diagram showing the general construction of the first embodiment of an image extracting and coding apparatus according to the present invention.

Preferred embodiments of the present invention will be described with reference to the accompanying drawings:

(1) The First Embodiment of the Structure Extracting and Coding Apparatus (1-1) General Construction In FIG. 3, 40 generally designates a structure extracting and coding apparatus, which includes a line width coder 41 for coding a distance between curves at a feature point.

The structure extracting and coding apparatus 40 quantizes an input video signal S1 by means of a quantizer 42 and thus generates a quantization coefficient S2, and then sends it to a multiplexer 43.

A two-dimensional change point detecting circuit 44 detects the feature point from the input video signal S1, and sends "1" to a chain coder 45 as a feature point signal S30 if the present signal is detected as the feature point, otherwise sends 0. The two-dimensional change point detecting circuit 44 detects the feature point by the canny edge detecting method, and sends a maximum change direction on each feature point used at this time to the line width coder 41 as a feature point maximum change direction signal S31.

The line width coder 41 calculates a distance between curves at the feature point, e.g., an edge width, on the basis of the input video signal S1 and the feature point maximum change direction signal S31, and then sends it to the multiplexer 43 as a line width signal S32. The chain coder 45 chain codes the pixel having the feature point signal S30 of 1, and then sends it to the multiplexer 43 as the chain code signal S33.

The multiplexer 43 multiplexes a chain code signal S33, the quantization coefficient S2 at the feature point, and the line width signal S32, and then sends it to a buffer memory 46 as a multiplexed feature point signal S34. The buffer memory 46 smooths the information quantity of the multiplexed feature point signal S34, and then outputs it as an output signal S35 of the structure extracting and coding apparatus 40.

Figure 4:
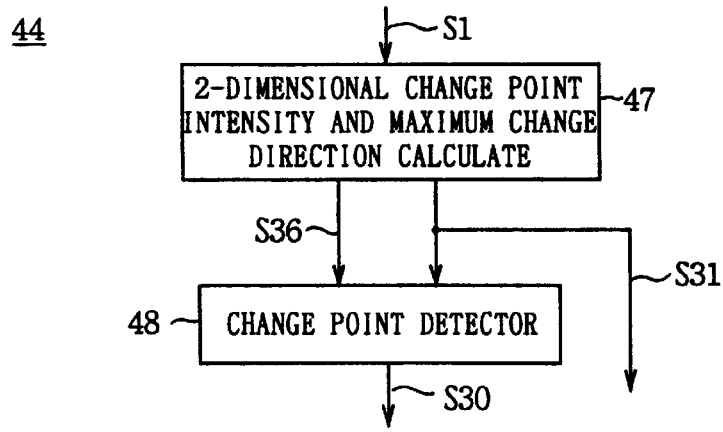
FIG. 4 is a block diagram showing the construction of a two-dimensional change point detecting circuit of the embodiment.

The two-dimensional change point detecting circuit 44 is constructed as shown in FIG. 4, which detects the feature point of the input video signal S1 by canny edge detecting method. In the two-dimensional change point detecting circuit 44, the change intensity and the maximum change direction of the input video signal S1 are calculated by means of a two-dimensional change point intensity and maximum change direction calculating circuit 47, and then a change intensity signal S36 obtained at the above is sent to a change point detecting circuit 48, and the maximum change direction signal S31 is sent to the change point detecting circuit 48 and to the line width coder 41 (FIG. 3).

The change point detecting circuit 48 judges whether or not each point at the maximum change direction is the change point on the basis of the change intensity signal S36 and the maximum change direction signal S31, and then sends a flag "1" if the point is the change point, or sends a flag "0" thereto if the point is not the change point, to the chain coder 45 (FIG. 3) as the change point detection signal at the maximum change direction, e.g., the feature point signal S30.

Figure 5:
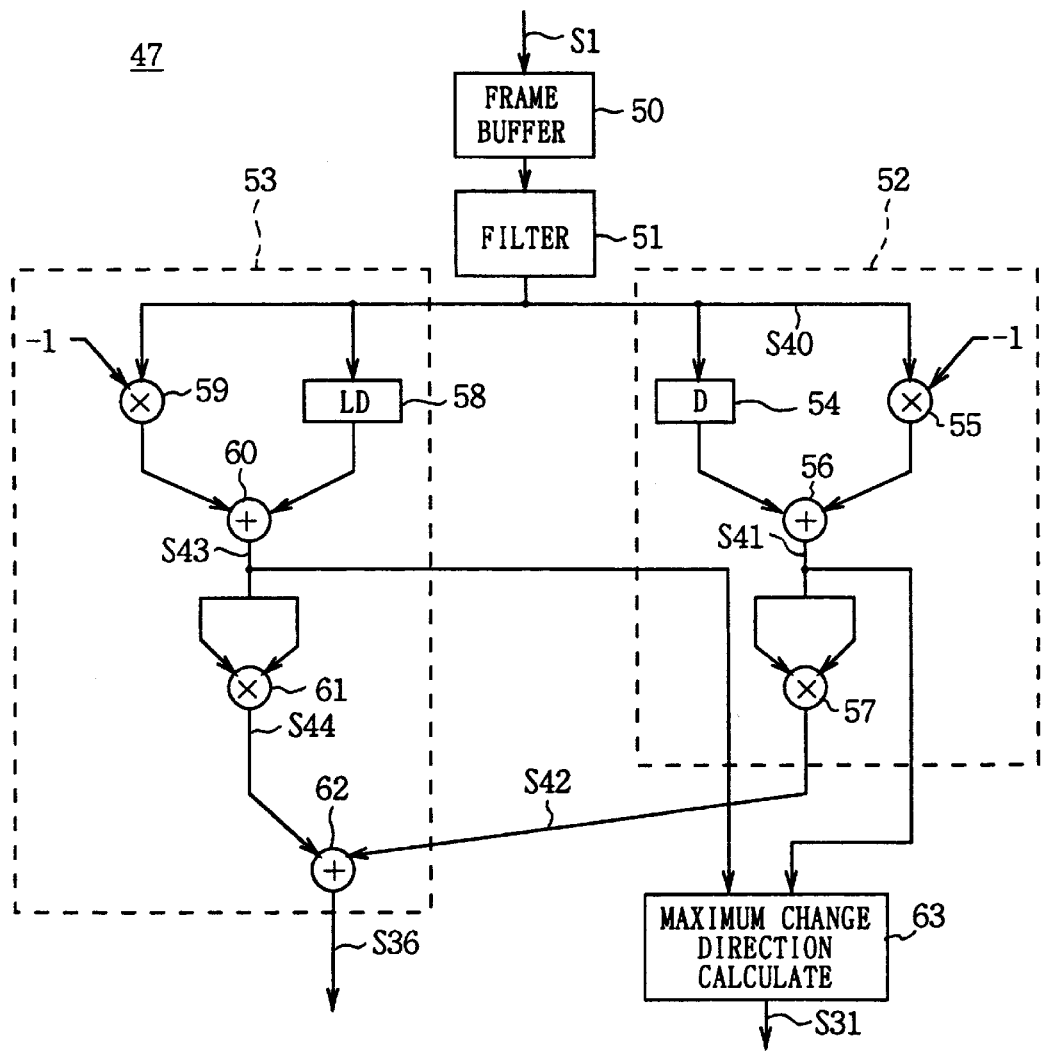
FIG. 5 is a block diagram showing the construction of the two-dimensional change point intensity and maximum change direction calculating circuit of the embodiment.

The two-dimensional change point intensity maximum change direction calculating circuit 47 is constructed as shown in FIG. 5. The two-dimensional change point intensity maximum change direction calculating circuit 47 once stores the input video signal S1 in a frame buffer 50, and then smooths it by means of a filter 51. The smoothed signal S40 which is output from the filter 51 is sent to a lateral direction processing unit 52 and a longitudinal direction processing unit 53, respectively.

The lateral direction processing unit 52 supplies the smoothed signal S40 to an adder 56 via a delay element 54 and a multiplier 55 respectively, thereby a difference between the present signal and the signal preceding one sample is obtained by the adder 56, and a lateral direction amplitude inclination signal S41 is generated. The lateral direction amplitude inclination signal S41 is squared by a multiplier 57, thereby a lateral direction amplitude inclination signal power S42 is obtained.

The longitudinal direction processing block 53 supplies the smoothed signal S40 to an adder 60 via a line delay 58 and a multiplier 59 respectively, thereby a difference between the present signal and the signal preceding one line is obtained by the adder 60, and a longitudinal direction amplitude inclination signal S43 is generated. The longitudinal direction amplitude inclination signal S43 is squared by a multiplier 61, thereby a longitudinal direction amplitude inclination signal power S44 is obtained.

The lateral direction amplitude inclination signal power S42 and the longitudinal direction amplitude inclination signal power S44 are added by an adder 62, thereby a change point intensity signal S36 is generated. Besides, the lateral direction amplitude inclination signal S41 and the longitudinal direction amplitude inclination signal S43 are given to a maximum change direction calculating circuit 63.

The maximum change direction calculating circuit 63 outputs a maximum change direction signal S31 in accordance with the rules shown in FIG. 6. More specifically, assuming that the lateral amplitude inclination signal S41 is A and the longitudinal direction amplitude inclination signal S43 is B, the maximum change direction calculating circuit 63 calculates arctan (B/A) and so as to obtain a direction C, and then outputs any value of [0] to [3] as the maximum change direction signal S31, in response to the range of the direction C.

Figure 7:
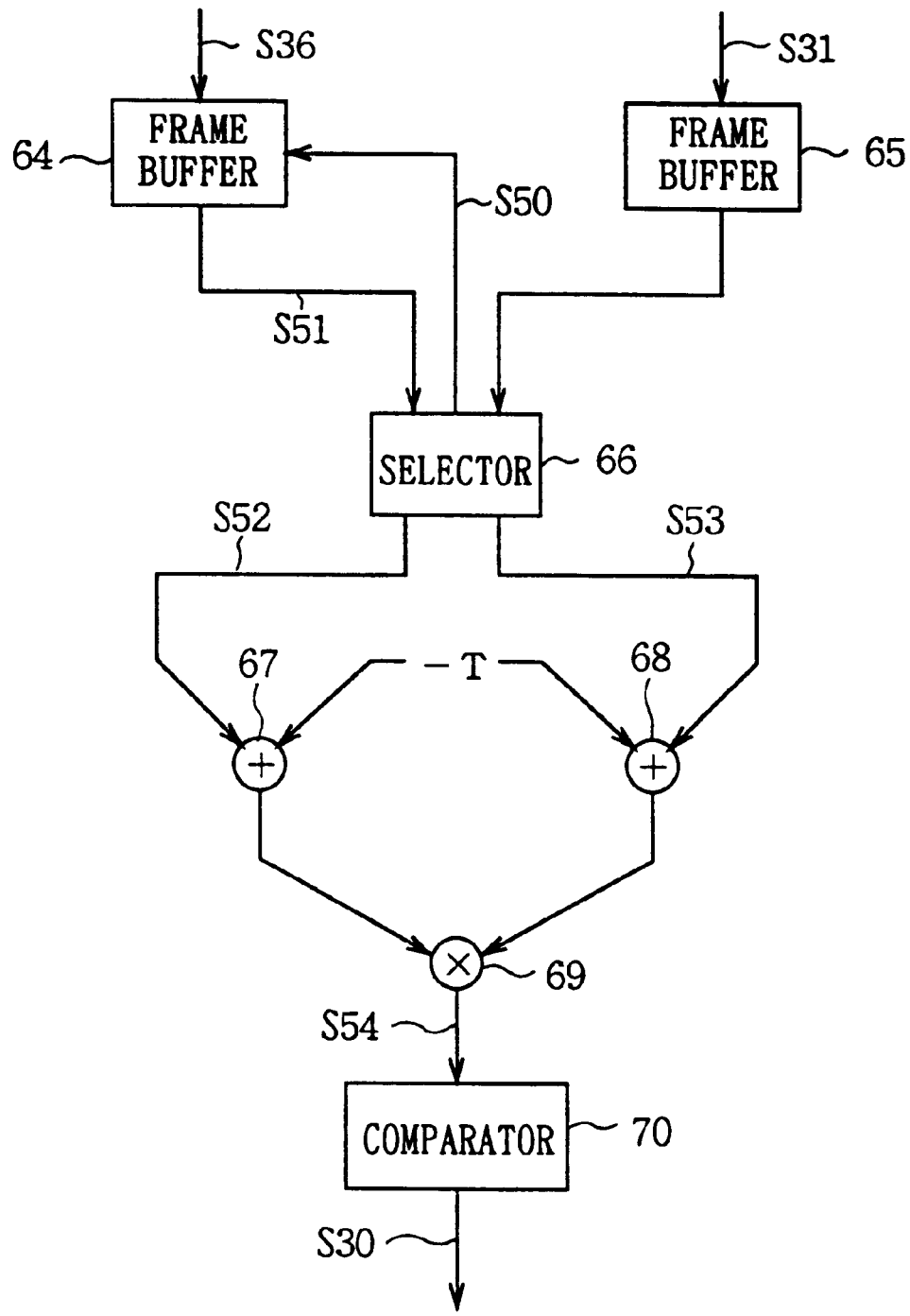
FIG. 7 is a block diagram showing the construction of a change point detecting circuit.

The change point detecting circuit 48 is constructed as shown in FIG. 7. The change point detecting circuit 48 once stores the change point intensity signal S36 in a frame buffer 64, and the maximum change direction signal S31 in a frame buffer 65, respectively. A selector circuit 66 outputs an address signal S50 to the frame buffer 64 on the basis of the maximum change direction signal S31 of a certain point input from the frame buffer 65, thus sequentially inputs a change point intensity signal S51 of a maximum change direction candidate point from the frame buffer 64.

Thereby, the selector circuit 66 obtains a change point intensity signal S52 of the first maximum change direction candidate point and a change point intensity signal S53 of the second maximum change direction candidate point, and then sends these signals to adder circuits 67 and 68, respectively. In the case, for example, where [0] is input as the maximum change direction signal S31, the selector circuit 66 selects a value of the C3 position as the change point intensity signal S52 of the first maximum change direction candidate point, and selects a value of the C4 position as the change point intensity signal S53 of the second maximum change direction candidate point, as shown in FIG. 8B.

The difference output between the change point intensity signal S52 of the first maximum change direction candidate point obtained by the adder 67 and the threshold value T, and the difference output between the change point intensity signal S53 of the second maximum change direction candidate point obtained by the adder 68 are multiplied at a multiplier 69, and the result of the multiplication becomes to a change signal S54 of the maximum change direction. When the change signal S54 is less than "0", a comparator 70 outputs a flag "1"; otherwise when it is "0" or more outputs a flag "0" as the change point detection signal at the maximum change direction, that is, the feature point signal S30.

(1-2) Construction of the Stroke Width Coder

Figure 9:
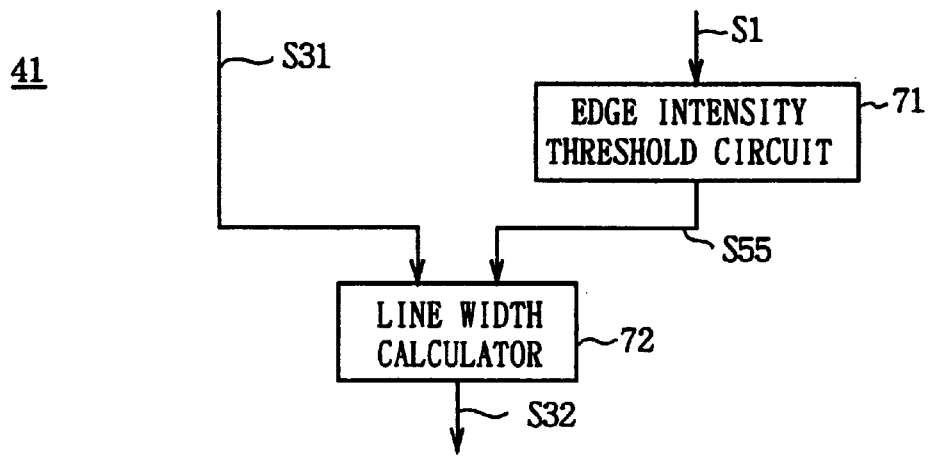
FIG. 9 is a block diagram showing an embodiment of a line width coder utilized in the image extracting and coding apparatus of FIG. 3.

The line width coder 41 is constructed as shown in FIG. 9. The line width coder 41 inputs the input video signal S1 to an edge intensity threshold circuit 71, and inputs the maximum change direction signal S31 to a line width calculating circuit 72. The edge intensity threshold circuit 71 judges whether or not the edge intensity is the threshold level E or more, and sends "1" in the case where the edge intensity of the inputted point is the threshold level E or more, or sends "0" in the case where it is less than the threshold level E to the line width calculating circuit 72 as an edge intensity threshold signal S55.

The line width calculating circuit 72 calculates the line width in the maximum change direction of the point which is being processed presently on the basis of the maximum change direction signal S31 and the edge intensity threshold signal S55, and then outputs it as the line width signal S32.

Figure 10:
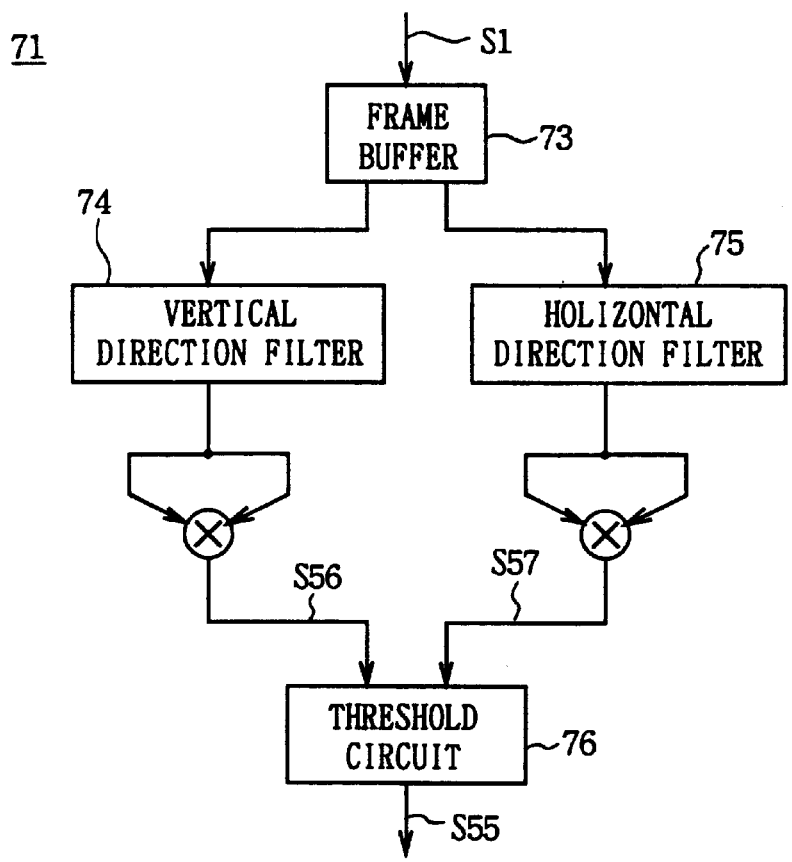
FIG. 10 is a block diagram showing the construction of an edge intensity threshold circuit.

The edge intensity threshold circuit 71 is constructed as shown in FIG. 10. The edge intensity threshold circuit 71 once stores the input video signal S1 in a frame buffer 73, and then performs vertical and horizontal filterings by means of a vertical direction filter circuit 74 and a horizontal direction filter circuit 75, respectively, and thereby calculates the edge intensity. In the embodiment, the filter coefficient of the vertical direction filter circuit 74 is selected as shown in FIG. 11A, and the filter coefficient of the horizontal direction filter circuit 75 is selected as shown in FIG. 11B. Therefore, the vertical direction filter circuit 74 and a horizontal direction filter circuit 75 have construction of sobel filters, and extracts high frequency components (that is, edge components) of the input video signal S1.

The respective filter circuit outputs are squared so that their electric power is calculated, thereby become to a vertical direction edge intensity power S56 and a horizontal direction edge intensity power S57. A threshold circuit 76 outputs "1" in the case where a sum of the vertical direction edge intensity power S56 and the horizontal direction edge intensity power S57 is a certain threshold value E or more, as an edge intensity threshold signal S55, or outputs "0" in the case where the sum is less than E.

Figure 12:
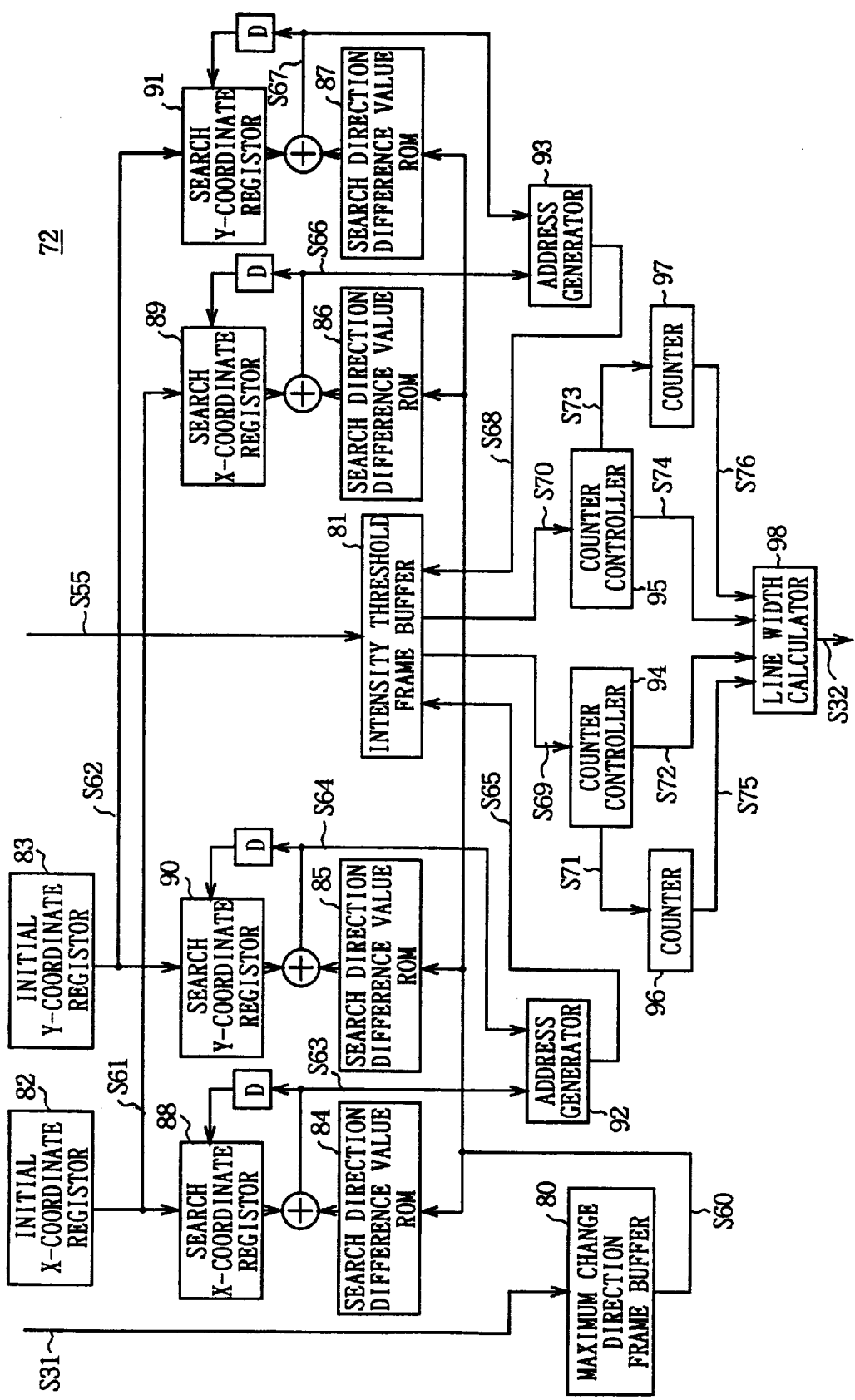
FIG. 12 is a block diagram showing the construction of a line width calculating circuit.

The line width calculating circuit 72 is constructed as shown in FIG. 12. The line width calculating circuit 72 once stores the maximum change direction signal S31 and the intensity threshold signal S55 in a maximum change direction frame buffer 80 and an intensity threshold frame buffer 81, respectively. An initial X-coordinate register 82 and an initial Y-coordinate register 83 hold the X- and Y-coordinates of the point which is to be processed at present (hereinafter referred to as the present point).

Search direction difference value ROMs 84, 85, 86 and 87 regard a maximum change direction signal S60 of the present point as an address input, and output the contents corresponding to the address. Examples of contents of the search direction difference value ROMs 84 to 87 are shown in FIG. 13.

A first search X-coordinate register 88 is initialized with an initial X-coordinate signal S61 at the starting time of the processing of the present point, and after that, a sum of the first search X-coordinate register 88 and the search direction difference value ROM 84, which is delayed in an amount of one sample, is set therein. Similarly, the second search X-coordinate register 89 is initialized with an initial X-coordinate signal S61 at the starting time of the processing of the present point, and after that, a sum of the second search X-coordinate register 89 and the search direction difference value ROM 86, which is delayed in an amount of one sample, is set therein.

A first search Y-coordinate register 90 is initialized with an initial Y-coordinate signal S62 at the starting time of the processing of the present point, and after that, a sum of the first search Y-coordinate register 90 and the search direction difference value ROM 85, which is delayed in an amount of one sample, is set therein. Similarly, a second search Y-coordinate register 91 is initialized with the initial Y-coordinate signal S62 at the starting time of the processing of the present point, and after that, a sum of the second search Y-coordinate register 91 and the search direction difference value ROM 87, which is delayed in an amount of one sample, is set therein.

On the basis of a first search X-coordinate signal S63 and a first search Y-coordinate signal S64, an address generating circuit 92 calculates an address for reading out the signal of the specified coordinate in the intensity threshold frame buffer 81, and then outputs it as the first search address signal S65. On the basis of the second search X-coordinate signal S66 and the second search Y-coordinate signal S67, an address generating circuit 93 similarly calculates the address for reading the signal of the specified coordinate in an intensity threshold frame buffer 81, and then outputs it as the second search address signal S68.

The intensity threshold frame buffer 81 sends the content of the address specified by the first search address signal S65 to a counter controller 94 as the first intensity threshold signal S69, and sends the content of the address specified by the second search address signal S68 to a counter controller 95 as the second intensity threshold signal S70.

During the first intensity threshold signal S69 is "1", the counter controller 94 outputs "1" to a the first counter increment signal S71, and outputs "0" to the first search termination signal S72. If the first intensity threshold signal S69 has once become to "0", the counter controller 94 outputs "0" to the first counter increment signal S71 and outputs "1" to the first search termination signal S72.

Similarly, during a second intensity threshold signal S70 is "1", the counter controller 95 outputs "1" to a second counter increment signal S73, and outputs "0" to a second search termination signal S74. If the second intensity threshold signal S70 has once become to "0", the counter controller 95 outputs "0" to the second counter increment signal S73 and outputs "1" to the second search termination signal S74.

Counters 96 and 97 are reset to "0" at the starting time of the processing of the present point, and increment the contents when the inputs are "1".

When both of the first search termination signal S72 and the second search termination signal S74 are "1", a line width calculator 98 adds counter outputs S75 and S76, and outputs the result as the line width signal S32.

(1-3) Operation

In the above construction, the structure extracting and coding apparatus 40 detects the feature point with the two-dimensional change point detecting circuit 44 by means of canny edge detecting method, and then chain codes the coordinates of the feature point by the chain coder 45 on the basis of the resulting feature point signal S30.

Furthermore, the structure extracting and coding apparatus 40 sends the maximum change direction signal S31 obtained in the two-dimensional change point detecting circuit 44 to the line width coder 41. In the line width coder 41, an edge is detected by extracting the high frequency components of the input video signal S1 by means of the vertical direction filter 74 and the horizontal direction filter 75, and the threshold judgment of the edge intensity with the specified threshold value E is performed, thereby the edge of which edge intensity is the threshold value E or more is detected.

The line width coder 41 obtains the line width at the maximum change direction (e.g., the edge width of which edge intensity is the specified value E or more), by means of the line width calculating circuit 72, on the basis of the maximum change direction signal S31 and the edge intensity threshold signal S55.

Then, the structure extracting and coding apparatus 40 multiplexes the coordinates of the chain-coded feature point obtained at the chain coder 45 and the coded line width signal S32 obtained at the line width coder 41, by means of the multiplexer 43.

As a result, in the structure extracting and coding apparatus 40, the coordinates of the feature point which are generally chain coded as two parallel curves at the edge portion can be represented by the coordinates of the curve which goes along the center of the two curcurves and the distance between the two curves. Since the distance between the two curves scarcely changes, it can be represented with the very little amount ot of bits when entropy coding is performed, and thus the amount of bits required for coding of the coordinate information can be reduced.

(1-4) Effect

According to the above construction, the chain-coded coordinates of the feature point obtained by canny edge method, and the coded length of the region of which edge intensity in the edge intensity maximum change direction at the feature points is the specified value E or more are multiplexed, thereby the amount of bits required for coding of the coordinates information can be reduced.

Figure 14:
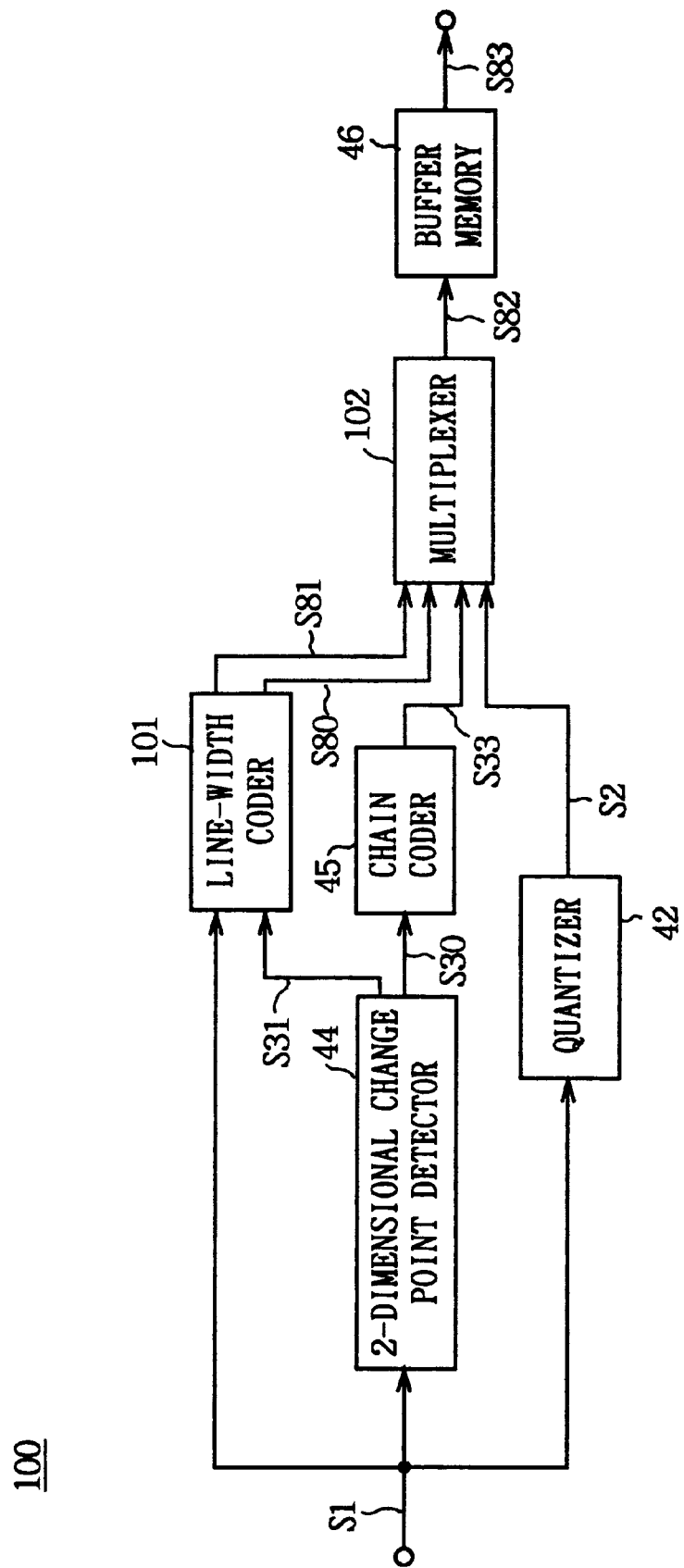
FIG. 14 is a block diagram showing the general construction of the second embodiment of the structure extracting and coding apparatus according to the present invention.

(2) The Second Embodiment of the Structure Extracting and Coding Apparatus (2-1) General Construction In FIG. 14 in which the portions corresponding to those of FIG. 3 are designated by the same reference numerals, a line width coder 101 of a structure extracting and coding apparatus 100 calculates a distance between curves in a feature point on the basis of the input video signal S1 and the feature point maximum change direction signal S31, and outputs "1" to a cut flag signal S80 at the position where the distance between the curves have greatly changed, and averages the distance between the curves from the place where the cut flag signal S80 is "1" to the place where the cut flag signal S80 subsequently become to "1", and outputs the resulted one as a mean line width signal S81.

A multiplexer 102 multiplexes the chain code signal S33, the quantization coefficient S2, the mean line width signal S81, and the cut flag signal S80, and then sends the resulted one to the buffer memory 46 as a multiplexed feature point signal S82.

The buffer memory 46 smooths the quantity of the information of the multiplexed feature point signal S82, and then outputs the resulted one as an output signal S83 of the structure extracting and coding apparatus 100.

(2-2) Construction of the Line Width Coder

Figure 15:
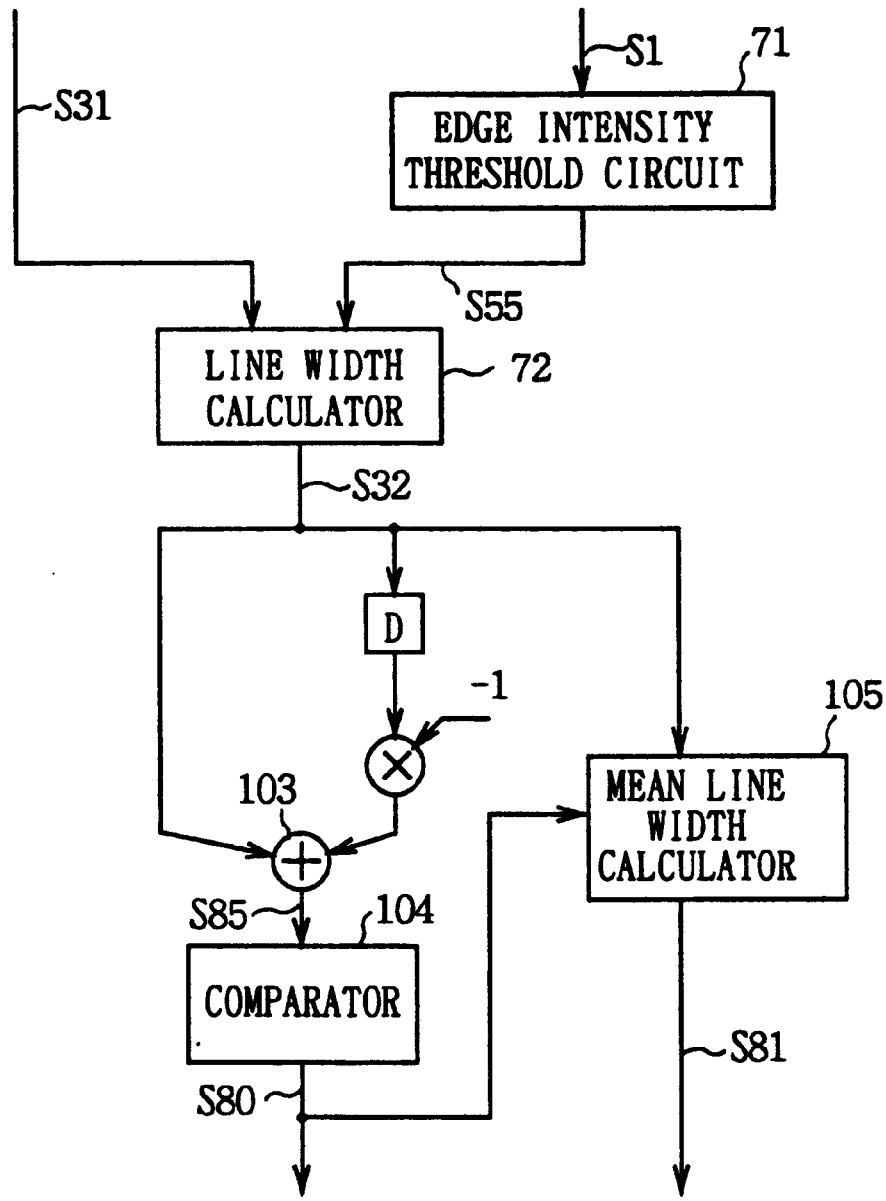
FIG. 15 is a block diagram showing the construction of the line width coder which is utilized in the image extracting and coding apparatus of FIG. 14.

The line width coder 101 is constructed as shown in FIG. 15. In FIG. 15, the portions which are corresponding to those of FIG. 9 are designated by the same reference numerals.

The line width coder 101 sends a line width signal S32 representing a line width at the maximum change direction of the present point calculated by a line width calculating circuit 72 to a comparator 104 via an adder 103, and also sends it to a mean line width calculating circuit 105.

The comparator 104 receives the signal S85 of the difference between the line width of the present feature point and the line width of the feature point preceding one frame, and outputs "1" as the cut flag signal S80 in the case where its absolute value is the threshold level T or more. On the other hand, if the absolute value is less than the threshold level T, it outputs "0" as the cut flag signal S80.

In the case where the cut flag signal S80 is "1" or become the end of the chain, the mean line width calculating circuit 105 calculates the mean value of the line width from the previously cut portion to the present portion on the basis of the line width signal S32, and outputs the result of the calculation as the mean line width signal S81.

(2-3) Operation

In the above construction, when the present line width value has changed the specified value or more with respect to the preceding line width value, the line width coder 101 of the structure extracting and coding apparatus 100 sends "1" to the following multiplexer 102 as the cut flag signal S80, and calculates the mean value of the line width from the portion cut previously to the portion which is cut this time, and then sends the result of the calculation to the multiplexer 102 as the mean line width signal S81.

In the multiplexer 102, the chain-coded coordinates of the feature point obtained in the chain coder 45, and the coded mean line width signal S81 and the cut flag signal S80 obtained in the line width coder 101 are multiplexed.

As a result, in the structure extracting and coding apparatus 100, all of the line width values of the case where the line width in the maximum change direction signal S31 (that is, the edge width of which edge intensity is the specified value or more) has become to the specified value or more is not coded, but the mean value of the line width values of the section is found in the case where the line width values of the section are substantially the same value, and then the mean value is coded.

(2-4) Effects

According to the above construction, the chain-coded coordinate of the feature point obtained by canny edge method, the one resulted from detecting of the length of the region of which edge intensity in the edge intensity maximum change direction at the feature point coordinates is the specified value E or more and averaging and coding of the length of the region of which length variation stays within the specified value, and the coded one of the information (the cut flag) representing the averaged portion are multiplexed, thereby the quantity of bits required for coding of the coordinates information can be further reduced.

Besides, a cut flag signal S80 is set at the place where the line width value greatly changes, and the averaging sections are sectioned such that they have substantially the same line width value, therefore the error of the occasion of averaging can be repressed.

(3) The First Embodiment of the Feature Point Decoding Circuit

Figure 16:
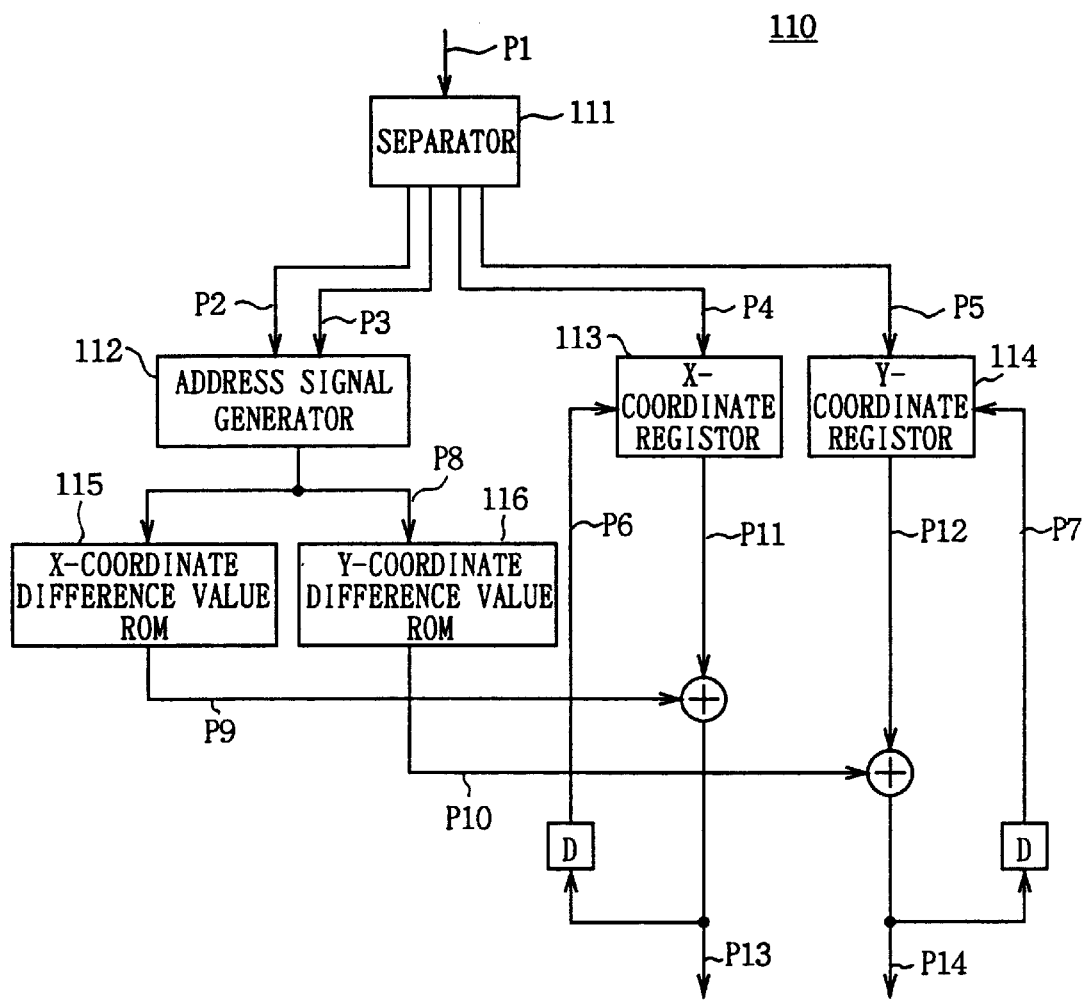
FIG. 16 is a block diagram showing an embodiment of the feature point decoding circuit for decoding the data coded by the structure extracting and coding apparatus of FIG. 3 utilizing the line width coder of FIG. 9.

In FIG. 16, 110 generally shows a feature point decoding circuit, which decodes the data obtained in such a manner that the chain-coded one of the feature point coordinates detected by canny edge detecting method, and the coded one of the length of the region, including the feature point, of which edge intensity in the edge intensity maximum change direction is a certain constant value E or more are multiplexed, and then coded in the same way as the case where the line width coder 41 of FIG. 9 is applied to the structure extracting and coding apparatus 40 of FIG. 3.

The feature point decoding circuit 110 separates an input coded data P1 to a line width signal P2 and a direction signal P3 by means of a separator 111, and sends these to an address signal generator 112, and further separates it to a chain starting X-coordinate signal P4 and a chain starting Y-coordinate signal P5 at the forefront of the chain, and sends these to a X-coordinate register 113 and a Y-coordinate register 114, respectively.

In the X-coordinate register 113 and the Y-coordinate register 114, the chain starting X-coordinate signal P4 and the chain starting Y-coordinate signal P5 are respectively set at the forefront of the chain, and a decoded X-coordinate signal P6 and a decoded Y-coordinate signal P7 of the preceding point are respectively set, on and after the starting point.

On the basis of the line width signal P2 and the direction signal P3, the address signal generator 112 generates an address signal P8 utilized for a following X-coordinate difference value ROM 115 and a Y-coordinate difference value ROM 116 to output the difference values until the point departing from the present point in an amount of the line width.

On the basis of the line width signal P2 and the direction signal P3, the address signal generator 112 generates an address signal P8 utilized for a following X-coordinate difference value ROM 115 and a Y-coordinate difference value ROM 116 to output the difference values until the point departing from the present point in an amount of the line width.

Figure 17:
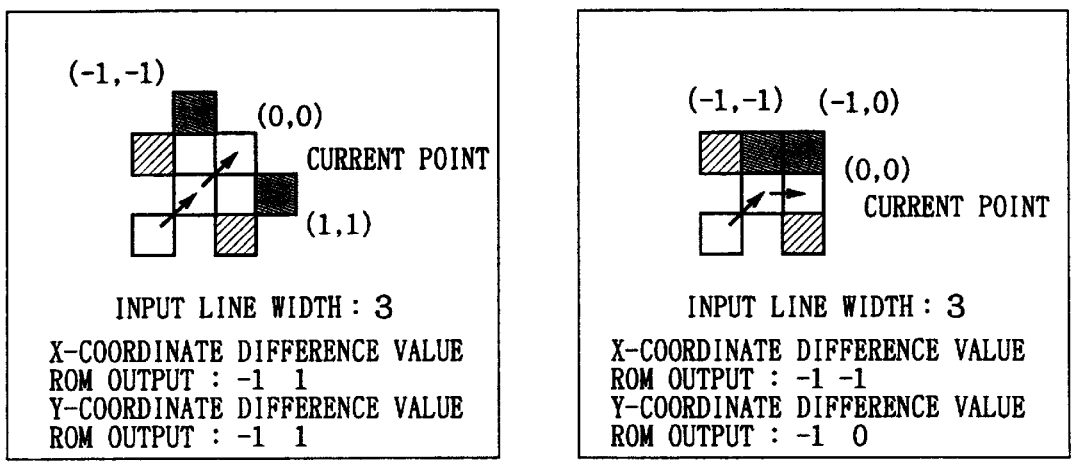
FIG. 17 is a schematic diagram explaining the operation of the X-coordinate difference value ROM and the Y-coordinate difference value ROM.

The X-coordinate difference value ROM 115 and the Y-coordinate difference value ROM 116 output the value by which the points departing from the present point in an amount of the line width are smoothly connected when being tied. The examples of the outputs of the X-coordinate difference value ROM 115 and the Y-coordinate difference value ROM 116 against the input line width signal P2 and the direction signal P3 are shown in FIG. 17.

A X-coordinate difference value signal P9 and a Y-coordinate difference value signal P10 are respectively added to a present point X-coordinate signal P11 and a present point Y-coordinate signal P12, and then output as a decoded X-coordinate signal P13 and a decoded Y-coordinate signal P14, respectively.

In the above construction, the feature point decoding circuit 110 separates the input coded data P1 to the line width signal P2, the direction signal P3, the chain starting X-coordinate signal P4, and the chain starting Y-coordinate signal P5.

The coordinates of the decoded feature points are sequentially output, from the X-coordinate register 113 and the Y-coordinate register 114.

In the address signal generator 112, the X-coordinate difference value ROM 115, and the Y-coordinate difference value ROM 116, the distance from the feature point as the center to the edge end points of the both sides are obtained on the basis of the line width signal P2 and the direction signal P3.

The feature point decoding circuit 110 adds the distances to the edge end points of the both sides to the coordinates of the feature point which is decoded as described above, thus obtains the decoded data P13 and P14.

According to the above construction, the feature point decoding circuit 110 having simple construction can be realized which is able to readily obtain the decoded image from the data generated in such a manner that a chain-coded one of the feature point coordinates which have been detected with the canny edge detecting method, and a coded one of the length of the region, including the feature point, of which edge intensity in the edge intensity maximum change direction at the feature point coordinates is the specified value E or more is multiplexed and then coded.

(4) The Second Embodiment of the Feature Point Decoding Circuit

Figure 18:
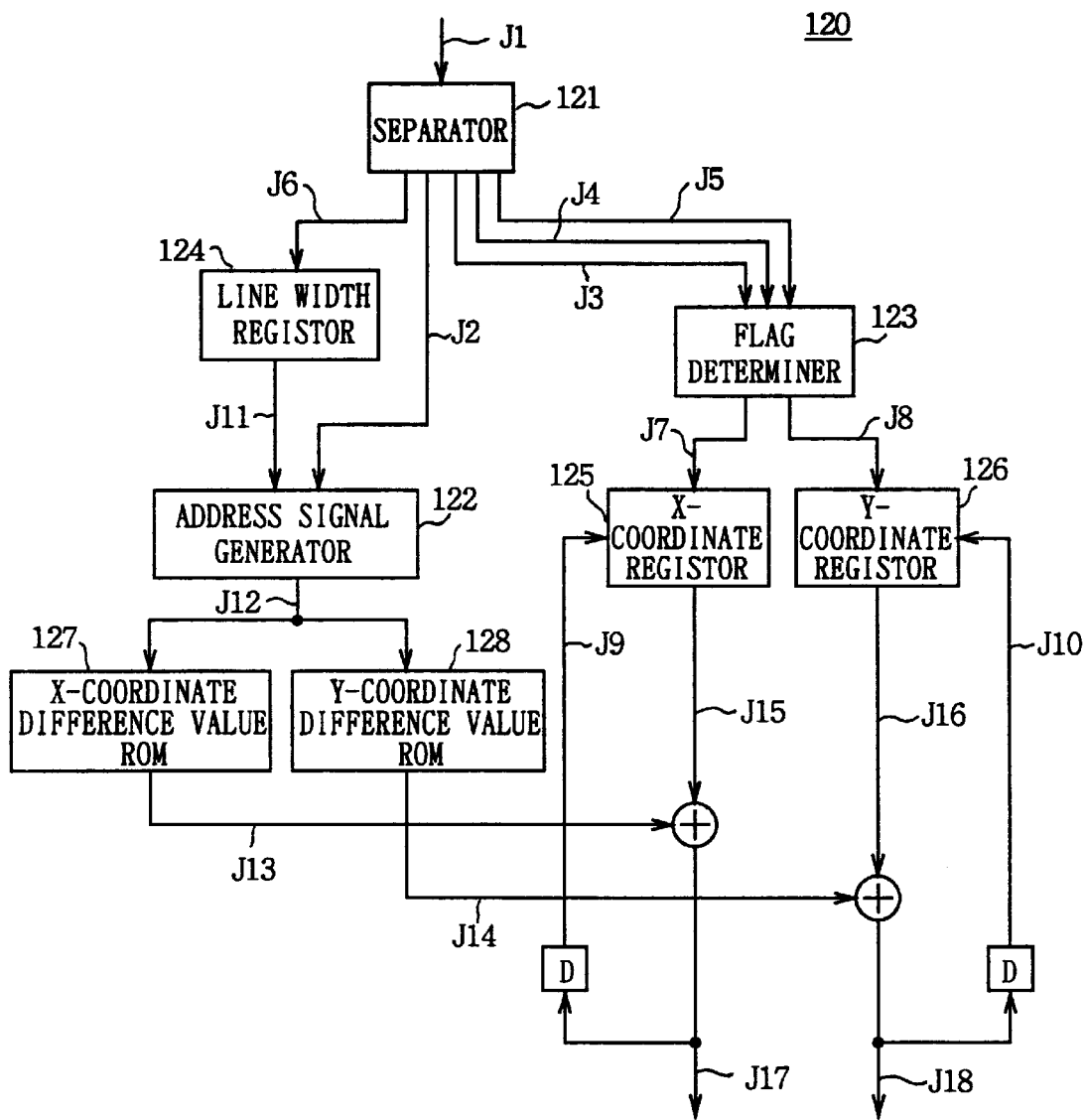
FIG. 18 is a block diagram showing an embodiment of the feature point decoding circuit for decoding the data coded by the structure extracting and coding apparatus of FIG. 14 utilizing the line width coder of FIG. 15.

In FIG. 18, 120 generally shows the feature point decoding circuit, which decodes the data obtained by multiplexing, in the same way as the structure extracting and coding apparatus 100 of FIG. 14, of a chain-coded one of the feature point coordinates detected with the canny edge detecting method, a cut flag set at the place where the line width has greatly changed, and a coded one of the line width value which has been averaged between the cut flags.

The feature point decoding circuit 120 separates a direction signal J2 from an input coded data J1 by means of a separator 121, and then sends it to an address signal generator 122. Besides, at the forefront of the chain, the input coded data J1 is further separated into a chain starting X-coordinate signal J3, a chain starting Y-coordinate signal J4, a cut flag signal J5, and a mean line width signal J6. The chain starting X-coordinate signal J3, the chain starting Y-coordinate signal J4, and the cut flag signal J5 are sent to a flag determination element 123, while the mean line width signal J6 sent to a line width register 124.

When the cut flag signal J5 is "1" at the forefront of the chain, the flag determination element 123 outputs the coordinates of the last point of the preceding chain as a determination starting X-coordinate signal J7 and a determination starting Y-coordinate signal J8, respectively. On the other hand, when the cut flag signal J5 is "0", the chain starting X-coordinate signal J3 and the chain starting Y-coordinate signal J4 are output as the determination starting X-coordinate signal J7 and the determination starting Y-coordinate signal J8, respectively.

At the forefront of the chain, the determination starting X-coordinate signal J7 and the determination starting Y-coordinate signal J8 are respectively set in a X-coordinate register 125 and a Y-coordinate register 126, while on and after the starting point, a decoded X-coordinate signal J9 of the preceding point and a decoded Y-coordinate signal J10 of the preceding point are set, respectively. As for the line width register 124, the mean line width signal J6 is set at the forefront of the chain.

On the basis of a line width register output J11 and the direction signal J2, the address signal generator 122 generates an address signal J12 for a following X-coordinate difference value ROM 127 and a Y-coordinate difference value ROM 128 to output the difference value to the point which is departing from the present point in an amount of the line width.

The X-coordinate difference value ROM 127 and the Y-coordinate difference value ROM 128 output the values by which the points departing from the present point in an amount of the lien width can be smoothly connected when they are connected. The examples of the outputs of the X-coordinate difference value ROM 127 and the Y-coordinate difference value ROM 128 against the line signal and the direction signal are shown in FIG. 17.

A X-coordinate difference value signal J13 and a Y-coordinate difference value signal J14 are respectively added to a present point X-coordinate signal J15 and the present point Y-coordinate signal J16, and then output as a decoded X-coordinate signal J17 and a decoded Y-coordinate signal J18, respectively.

In the above construction, the feature point decoding circuit 120 separates the input coded data J1 into the mean line width signal J6, the direction signal J2, the chain starting X-coordinate signal J3, the chain starting Y-coordinate signal J4, and the cut flag signal J5.

Next, the feature point decoding circuit 120 selects the final point of the preceding chain as the starting point of the present chain when the cut flag signal J5 is "1" at the forefront of the chain, and then sequentially decodes the coordinates of the feature points following to this chain starting point.

Besides, the feature point decoding circuit 120 obtains the distance from the feature point as the center to the edge end points of the both sides by means of the line width register 124, the address signal generator 122, the X-coordinate difference value ROM 127, and the Y-coordinate difference value ROM 128, on the basis of the mean line width signal J6 and the direction signal J2.

By adding the distance to the edge end points of the both sides to the feature point coordinates decoded as described above, the feature point decoding circuit 120 obtains the decoded data J17 and J18.

According to the above construction, the feature point decoding circuit 120 having simple construction can be realized which is able to readily obtain the decoded image from the data generated by multiplexing of the chain-coded one of the feature point coordinates detected with the canny edge detecting method, the cut flag set at the place where the line width has greatly changed, and the coded one of the line width value averaged between the cut flags.

(5) Other Embodiments (5-1) In the first embodiment of the structure extracting and coding apparatus described above, the line width coder having the construction shown in FIG. 9 is utilized as the line width coder 41. However, the present invention is not only limited to this, but, as the line width coder 41, the one having the construction as shown in FIG. 19 can be used.

Figure 19:
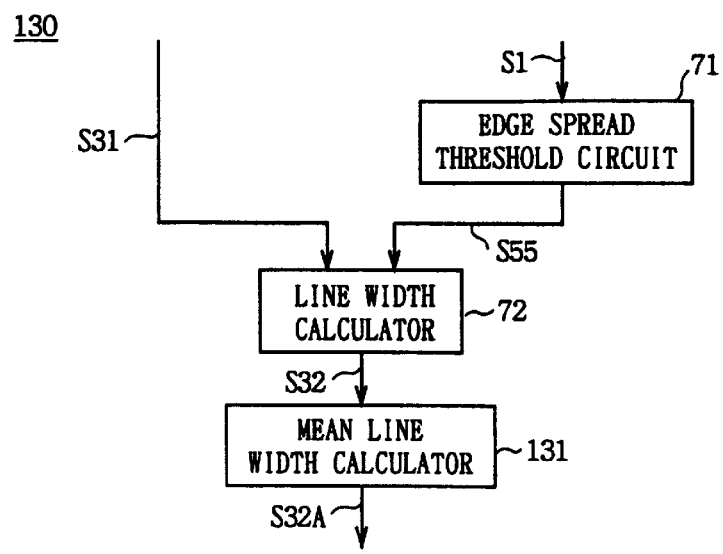
FIG. 19 is a block diagram showing the other embodiment of the line width coder which is utilized in the image extracting and coding apparatus of FIG. 3.

In FIG. 19 wherein the portions corresponding to those of FIG. 9 are designated by the same reference numerals, a mean line width calculating circuit 131 of a line width coder 130 calculates the line width of each feature point with respect to the present chain on the basis of the line width signal S32, and then divides the total sum of the line widths by the number of the feature points, and sends the resulted quotient to the following multiplexer 43 (FIG. 3) as a line width coder output S32A.

Figure 20:
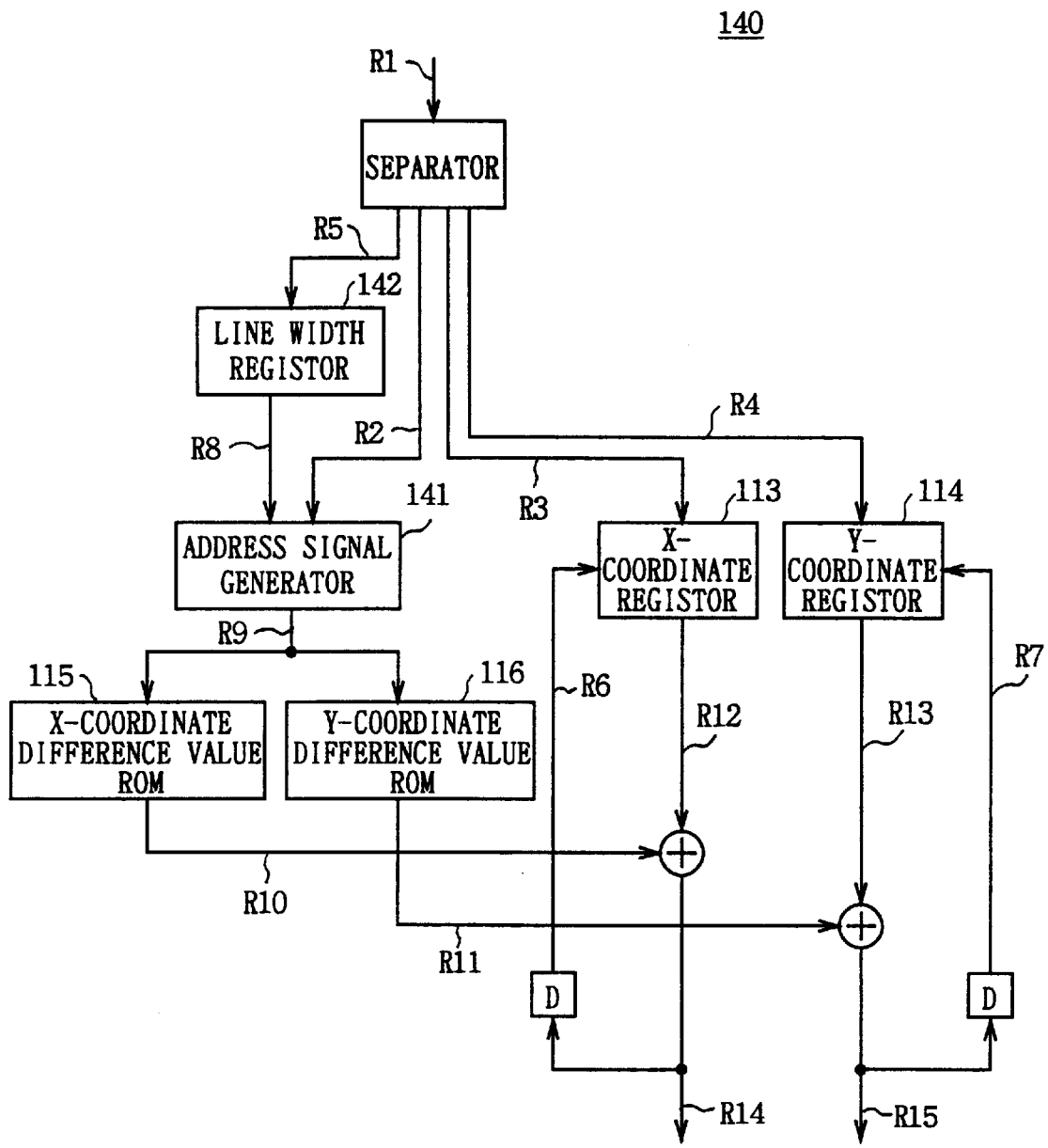
FIG. 20 is a block diagram showing the construction of the feature point decoding circuit for decoding the data coded by the structure extracting and coding apparatus of FIG. 3 utilizing the line width coder of FIG. 19.

(5-2) As in the same way as the case where the line width coder 130 has been used, a decoding circuit, for instance, having the construction shown in FIG. 20 can be used as the decoding circuit for decoding the coded data obtained by multiplexing of the chain-coded one of the feature point coordinates detected by the edge detecting method, and the coded one of the average value, in the present chain, of the length of the region, including the feature point, of which edge intensity in the edge intensity maximum change direction at the feature point coordinate s is the certain constant value E or more.

In FIG. 20 wherein the portions corresponding to those of FIG. 16 are designated by the same reference numerals, the feature point decoding circuit 140 separates a direction signal R2 from an input coded data R1 by means of the separator 111, and sends the signal to an address signal generator 141, and further separates the input coded data R1 at the forefront of the chain into a chain starting X-coordinate signal R3, a chain starting Y-coordinate signal R4, and a mean line width signal R5, and then sends the chain starting X-coordinate signal R3 to the X-coordinate register 113, the chain starting Y-coordinate signal R4 to the Y-coordinate register 114, and the mean line width signal R5 to a line width register 142, respectively.

In the X-coordinate register 113 and the Y-coordinate register 114, the chain starting X-coordinate signal R3 and the chain starting Y-coordinate signal R4 are respectively set at the forefront of the chain, and a decoded X-coordinate signal R6 and a decoded Y-coordinate signal R7 of the preceding point are set respectively on and after the starting point. A mean line width signal R5 is set in the line width register 142 at the forefront of the chain.

On the basis of a line width register output R8 and the direction signal R2, the address signal generator 141 generates an address signal R9 for the following X-coordinate difference value ROM 115 and the Y-coordinate difference value ROM 116 to output a difference value to the point departing from the present point in in an amount of the line width.

A X-coordinate difference value signal R10 and a Y-coordinate difference value signal R11 which are respectively output from the X-coordinate difference value ROM 115 and the Y-coordinate difference value ROM 116 are added to a present point X-coordinate signal R12 and a present point Y-coordinate signal R13 respectively, and then the output as a decoded X-coordinate signal R14 and a decoded Y-coordinate signal R15, respectively.

(5-3) In the second embodiment of the structure extracting and coding apparatus described above, the line width coder having the construction shown in FIG. 15 is utilized as the line width coder 101. However, the present invention is not only limited to this, but, as the line width coder 101 (FIG. 14), the one having the construction such as the construction shown in FIG. 19 can be used.

Figure 21:
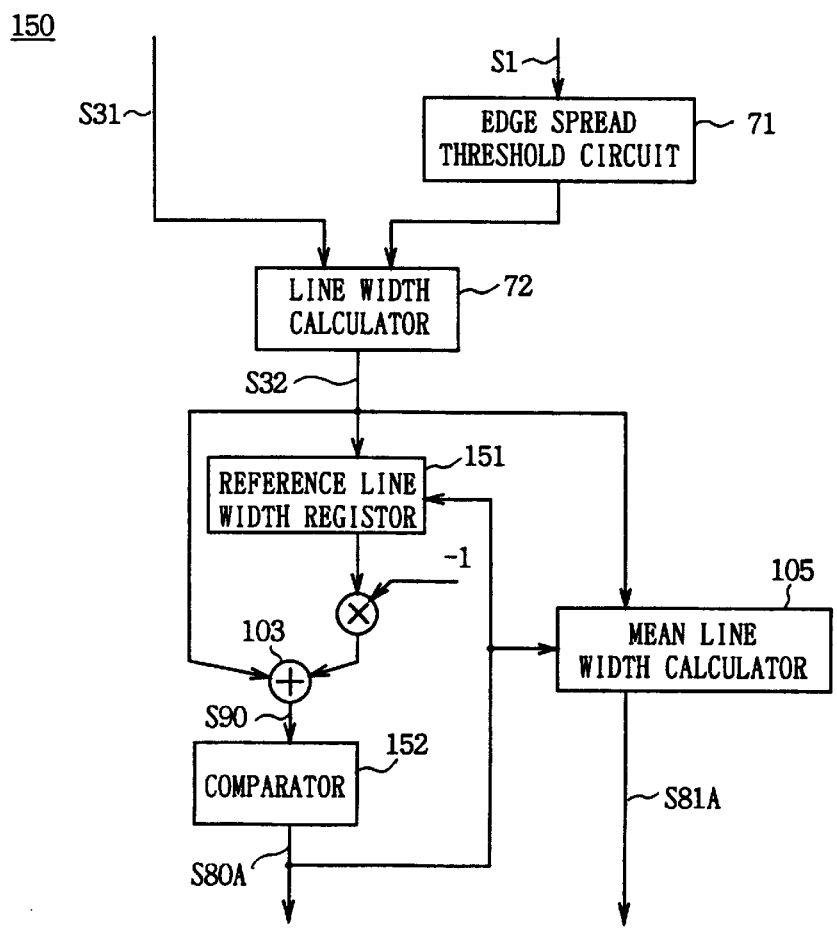
FIG. 21 is a block diagram showing the other embodiment of the line width coder which is utilized in the image extracting and coding apparatus of FIG. 14.

In FIG. 21 wherein the portions corresponding to those of FIG. 15 are designated by the same reference numerals, a line width coder 150 has a reference line width register 151. A line width signal S32 transmitted when the forefront of each chain or the cut flag signal S80A has become to "1" is set in the reference line width register 151.

A comparator 152 receives a differential signal S90 which is the difference between the content of the reference line width register 151 and the line width of the present feature point, and outputs "1" as a cut flag signal S80A when the absolute value of the signal S90 is the threshold level T or more. On the other hand, when that absolute value is less than the threshold level T, "0" is output as the cut flag signal S80A.

When the cut flag signal S80A is "1" or becomes the last of the present chain, the mean line width calculating circuit 105 calculates the mean value of the line width from the feature point previously cut to the present point on the basis of the line width signal S32, and outputs the result of the calculation as a mean line width signal S81A.

As a result, in the line width coder 101, even the case where the line width value gradually changes, each line width value always can be compared on the basis of the line width value of the forefront, therefore the error owing to the averaging can be reduced.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video signal coding method for detecting feature points of an input video signal and for coding coordinates of the feature points, comprising the steps of:

detecting feature points of said input video signal by a canny edge detecting method;

generating chain coded data by chain coding coordinates of said detected feature points;

detecting an edge of said input video signal by extracting high frequency components of said input signal and determining whether an edge intensity of said edge is at least a specified value;

generating region length coded data by coding a length of a region including said feature points, of which edge intensity is at least said specified value in an edge intensity maximum change direction at coordinates of said detected feature points; and multiplexing the chain coded data and the region length coded data, wherein:

at said step of coding a length of a region, a mean value of the length of the region is obtained, and then the mean value is coded; and at said step of multiplexing, said chain coded data and said region length coded data for said mean value are multiplexed.

2. A video signal coding method for detecting feature points of an input video signal and for coding coordinates of the feature points, comprising the steps of:

detecting feature points of said input video signal by a canny edge detecting method;

generating chain coded data by chain coding coordinates of said detected feature points;

detecting an edge of said input video signal by extracting high frequency components of said input signal and determining whether an edge intensity of said edge is at least a specified value;

obtaining a length of the region including said feature points, of which edge intensity is at least said specified value in the edge intensity maximum change direction at coordinates of said detected feature points;

setting a cut flag at a portion where said length of the region greatly changes, and coding a mean value of said length of the region from one of a chain starting place, a place where said cut flag is set to a chain ending point or a place where said cut flag is subsequently set; and multiplexing the chain coded data, and the coded mean value of said length of the region.

3. The video signal coding method according to claim 2, wherein:

at said step of coding the mean value of said length of the region, said cut flag is set at a place where an absolute value of a difference between a present length of the region and a preceding length of the region becomes at least a specified threshold value.

4. The video signal coding method according to claim 2, wherein:

at said step of coding the mean value of said length of the region, an absolute value of the difference between a length of the region of the chain starting point and the length of the region following each feature point is sequentially compared with a specified threshold value, and said cut flag is set at a place where the absolute value of the difference becomes at least the specified threshold value, and then the absolute value of the difference between the length corresponding to the place where said cut flag is set and the length of the region of the each subsequent feature point is sequentially compared with the specified threshold value, and said cut flag is set at the place where said absolute value of the difference becomes at least the threshold value.

5. A video signal decoding method for decoding coded data generated by multiplexing a chain coded one of feature point coordinates detected from an input video signal by a canny edge detecting method and region length data obtained by coding a length of the region including the feature points, of which edge intensity is at least a specified value in an edge intensity maximum change direction at the feature point coordinates, comprising the steps of:

separating from said coded data coordinate data of said feature points and region length data; and decoding end point coordinates of an edge region corresponding to each feature point on the basis of said coordinate data of said feature points and said region length data.

6. The video signal decoding method according to claim 5, wherein:

said region length data is a mean region length data which is obtained by averaging lengths of a plurality of said regions;

said coordinate data of the feature points and said mean region length data are separated from said coded data; and end point coordinates of an edge region corresponding to each of the feature points are decoded based on said coordinate data of the feature points and said mean region length data.

7. A video signal decoding method for decoding coded data generated by multiplexing a chain-coded one of coordinates of feature place detected from an input video signal by a canny edge detecting method, a cut flag set at a place where a length of a region has greatly changed, a length of region including the feature points, of which edge intensity is at least a specified value in the edge intensity maximum change direction at the feature point coordinates, and a mean region length data obtained by averaging the region length between cut flags, comprising the steps of:

separating from said coded data coordinate data of the feature points, said cut flag, and said mean region length data; and if said cut flag is set, the starting point of a chain is defined as a final point of a preceding chain, and then end point coordinates of the edge region corresponding to each feature point are decoded based on said coordinate data of the feature points and said mean region length data.

8. A video signal coding apparatus for detecting feature points of an input video signal and for coding coordinates of the feature points, comprising:

a detector for detecting feature points of said input video signal by a canny edge detecting method;

a chain coder for generating chain coded data by chain coding coordinates of said detected feature points;

an edge intensity threshold circuit for determining whether an edge intensity of said input signal is at least a specified value;

a line width calculating circuit for generating region length coded data by coding a length of a region including said feature points, of which edge intensity is at least a specified value in an edge intensity maximum change direction at coordinates of said detected feature points; and a multiplexer for multiplexing the chain coded data and the region length coded data, wherein:

said line width coder obtains a mean value of the length of the region, and then codes the mean value; and said multiplexer multiplexes said chain coded data and said region length coded data for said mean value.

9. A video signal coding apparatus for detecting feature points of an input video signal and for coding coordinates of the feature points, comprising:

a detector for detecting feature points of said input video signal by a canny edge detecting method;

a chain coder for generating chain coded data by chain coding coordinates of said detected feature points;

an edge intensity threshold circuit for determining whether an edge intensity of said input signal is at least a specified value;

a line width calculating circuit for obtaining a length of the region including said feature points, of which edge intensity is at least a specified value in the edge intensity maximum change direction at coordinates of said detected feature points;

means for setting a cut flag at a portion where said length of the region greatly changes, and coding a mean value of said length of the region from one of a chain starting place, a place where said cut flag is set to a chain ending point or a place where said cut flag is subsequently set; and a multiplexer for multiplexing the chain coded data, the region length coded data for the mean value and the cut flag.

10. The video signal coding apparatus according to claim 9, wherein:

said means for coding the mean value of said length of the region sets said cut flag at a place where an absolute value of a difference between a present length of the region and a preceding length of the region becomes at least a specified threshold value.

11. The video signal coding apparatus according to claim 9, wherein:

said means for coding the mean value of said length of the region sequentially compares with a specified threshold value an absolute value of the difference between a length of the region of the chain starting point and the length of the region following each feature point, and sets said cut flag at a place where the absolute value of the difference becomes at least the specified threshold value, and then sequentially compares with the specified threshold value the absolute value of the difference between the length corresponding to the place where said cut flag is set and the length of the region of the each subsequent feature point, and sets said cut flag at the place where said absolute value of the difference becomes at least the threshold value.

12. A video signal decoding apparatus for decoding coded data generated by multiplexing a chain coded one of feature point coordinates detected from an input video signal by a canny edge detecting method and region length data obtained by coding a length of the region including the feature points, of which edge intensity is at least a specified value in an edge intensity maximum change direction at the feature point coordinates, comprising:

means for separating from said coded data coordinate data of said feature points and region length data; and a decoder for decoding end point coordinates of an edge region corresponding to each feature point on the basis of said coordinate data of said feature points and said region length data.

13. The video signal decoding apparatus according to claim 12, wherein:

said region length data is a mean region length data which is obtained by averaging lengths of a plurality of said regions;

said means for separating coordinate data of the feature points and said mean region length data from said coded data; and said decoder decodes end point coordinates of an edge region corresponding to each of the feature points based on said coordinate data of the feature points and said mean region length data.

14. A video signal decoding apparatus for decoding coded data generated by multiplexing a chain-coded one of coordinate feature place of detected from an input video signal by a canny edge detecting method, a cut flag set at a place where a length of a region has greatly changed, a length of region including the feature points, of which edge intensity is at least a specified value in the edge intensity maximum change direction at the feature point coordinates, and a mean region length data obtained by averaging the region length between cut flags, comprising:

means for separating from said coded data coordinate data of the feature points, said cut flag, and said mean region length data; and a decoder for decoding end point coordinates of an edge region corresponding to each feature point based on said coordinate data of the feature points and said mean region length data, wherein, if said cut flag is set, the starting point of a chain is defined as a final point of a preceding chain.

* * * * *